Inventors
Donald B. McIlvin
Robert J. Bernard
By their Attorney
Scott R. Foster

United States Patent Office 3,443,279
Patented May 13, 1969

3,443,279
SHOE MOLDING MACHINES
Donald B. McIlvin, Danvers, and Robert J. Bernard, Peabody, Mass., assignors to USM Corporation, Flemington, N.J., a corporation of New Jersey
Filed Nov. 14, 1966, Ser. No. 594,087
Int. Cl. B29h 5/12
U.S. Cl. 18—17    6 Claims This invention relates to injection molding machines and is directed more particularly to such machines for injection molding sole-heel units combined with toe caps directly onto the bottoms and toe portions of lasted footwear uppers.

The invention is herein illustrated in connection with injection sole molding machines of the type disclosed in U.S. patent application Ser. No. 452,213, filed Apr. 30, 1965, now Patent No. 3,358,333, upon application of Charles J. Kitchener et al. It will be understood, however, that the invention may be embodied in numerous other machines as well.

The application above referred to discloses a machine for producing shoes having sole-heel units molded thereon. However, there has evolved a demand for a machine of this type which will mold, in addition to the sole and heel unit, a toe cap directly onto the toe portion of the lasted upper. A molded-on toe cap is especially desirable in shoes having canvas uppers, such as tennis shoes, sneakers and the like.

Accordingly, it is an object of the present invention to provide an improved machine for molding toe caps, as well as sole and heel units, directly onto lasted footwear uppers.

It is another object of the invention to provide such a machine having means for heating the toe portion of the upper prior to molding a toe cap thereon.

A still further object of the invention is to provide toe cap mold operating mechanism which may be easily and readily incorporated into existing machines without excessive machine alteration.

An additional object of the invention is to provide means for adjusting the position of one of the mold members with respect to the abutting mold members whereby to obtain a close cooperative fit between the various mold members so as to enclose a mold cavity for the molding of integral sole-heel and toe cap units to a lasted upper.

With the above and other objects in view, as will hereinafter appear, the present invention, in one aspect thereof, contemplates the provision in a machine of the type above referred to, of means associated with a mold assembly for cooperating with the mold assembly to facilitate the molding of a toe cap onto the toe portion of an upper at or about the same time as a sole and heel unit is being molded to the bottom of the upper.

In accordance with a further feature of the invention there is provided external heating means having provision for heating not only the overlasted margin portion of an upper mounted on a footform, but also the toe portion of the upper, thereby to prepare the surface of the upper for receiving of injection molding material.

In accordance with another feature of the invention there is provided toe cap mold moving means which operate to move a toe cap mold member into position for the molding of a toe cap onto a lasted upper, which means does not require alteration of the pneumatic and electrical circuit of the machine but which operates mechanically in response to movement of the lasted upper mounting means to move the toe cap mold member into its proper position.

In accordance with still another feature of the invention there is provided means associated with a top mold mounting means for adjusting the position of the top mold member with respect to the sole mold member and the toe cap mold member whereby to obtain as nearly perfect a cooperative fit as possible.

The above and other features of the invention, including various novel details of construction and combinations of parts, will now be more particularly described with reference to the accompanying drawings and pointed out in the claims. It will be understood that the particular machine embodying the invention is shown by way of illustration only and not as a limitation of the invention. The principles and features of this invention may be employed in various and numerous embodiments without departing from the scope of the invention.

Figure 1:
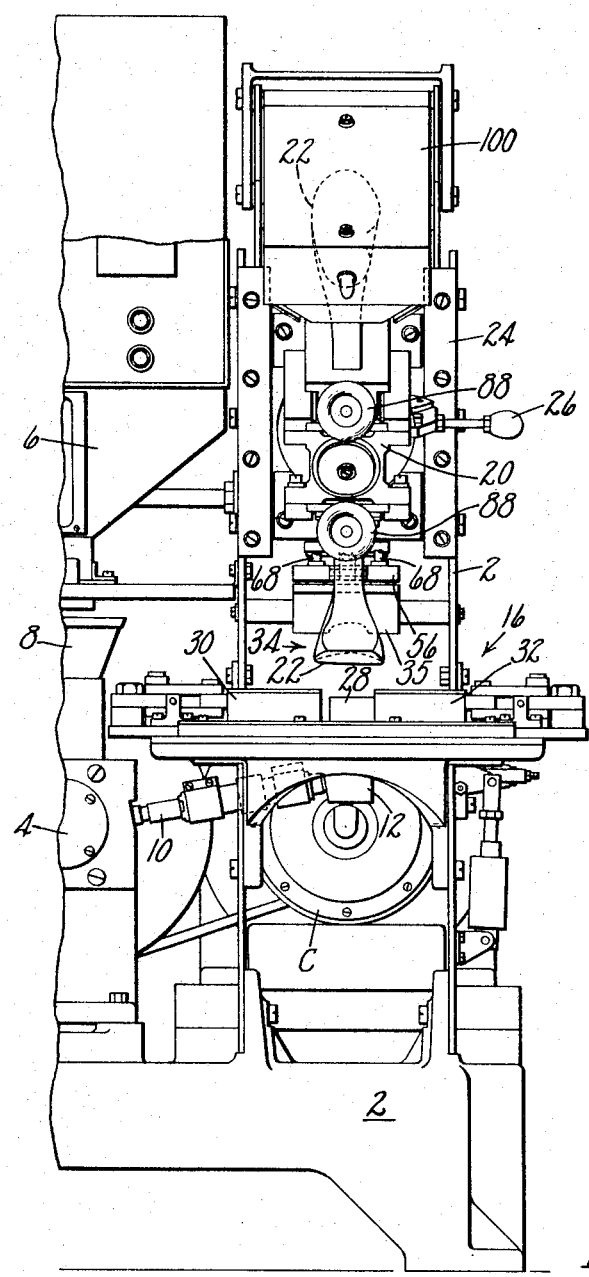
FIG. 1 is a front elevational view of one station of the two-station machine disclosed in the above identified patent application and embodying one form of the present invention.
Figure 2:
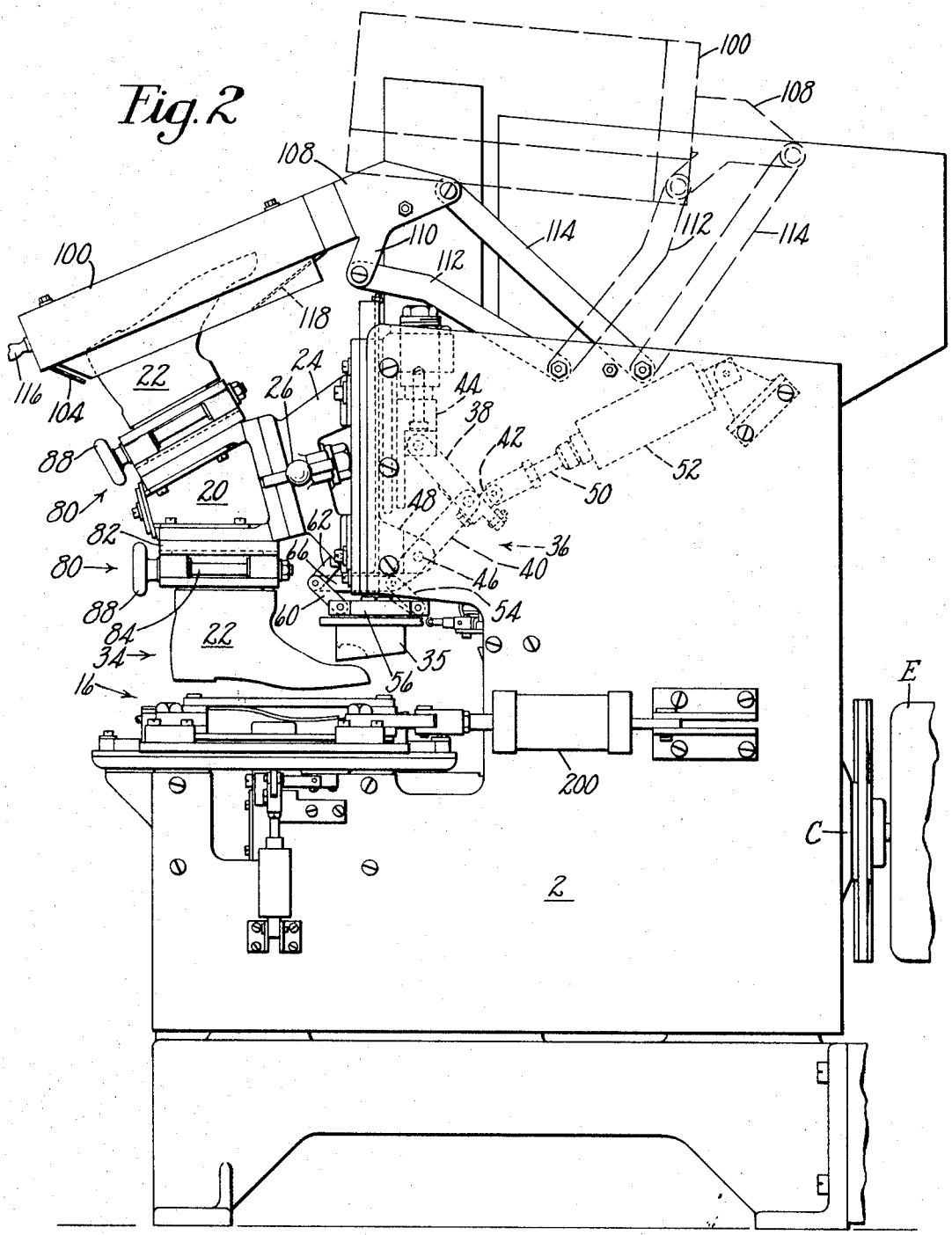
FIG. 2 is a side elevational view of the station shown in FIG. 1.

Referring to FIGS. 1 and 2, it will be seen that the illustrative machine includes a frame 2 on which there is mounted an electric motor E from which power is transmitted through a clutch C to a plasticator 4 fed from a hopper 6 through a funnel 8. From the plasticator 4, fluid plastic or rubber is transmitted through a conduit 10 to a nozzle housing 12 in which is mounted an injection nozzle and valve means (not shown). When the nozzle housing valve means is in condition to permit the passage of fluid therethrough, fluid plastic is transmitted to a mold cavity which is formed by a mold assembly generally designated 16. The arrangement and operation of a nozzle means within the nozzle housing is described in detail in the application of Charles J. Kitchener, referred to hereinabove.

The illustrative machine is provided with a footform housing 20 (FIGS. 2 and 3) which supports two oppositely extending lasts or footforms 22 and which is rotatably secured to a carriage 24 mounted for vertical sliding movement on the front of the frame 2. Thus, while one footform is extending in a downward direction for a molding operation, the other footform mounted on the same housing is extending upwardly, in position for mounting a flat lasted upper, or for string lasting, and for external heating, as will be described hereinbelow. Each housing 20 is provided with a locking lever 26 for locking the housing against rotation.

Figure 4:
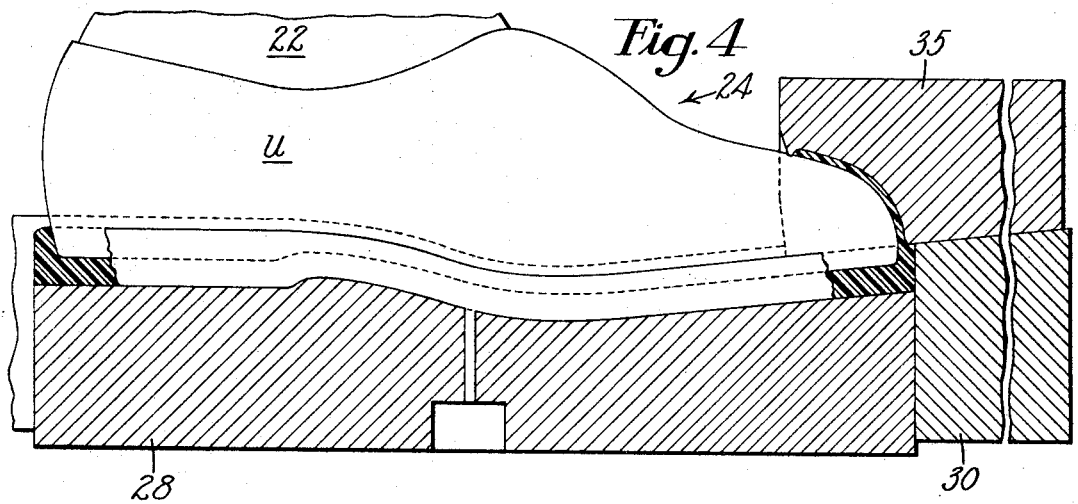
FIG. 4 is a sectional view of the mold assembly of the present invention, including the toe cap molding means, the section being taken along the longitudinal center line of the mold assembly.

The mold assembly 16 comprises a bottom mold member 28, two side mold members 30 and 32 (FIG. 1), and a top mold member 34 which may, as illustrated in FIG. 4, comprise a lasted shoe upper $u$ mounted on a last or footform 22. All of the foregoing is fully described in the above-identified patent application which may be referred to for greater detail. In addition to the mold members described thus far, the mold assembly of the present invention includes a toe cap mold member 35.

The footform carriage 24 has connected thereto a toggle mechanism 36 (FIGS. 2 and 3) comprising links 38 and 40 which are pivotally connected to each other. The link 38 is pivotally connected at one end to a stationary portion 44 of the machine. An intermediate portion of the link 40 is pivotally connected by a pin 46 to a lug 48 protruding from the carriage 24. The link 38 is connected by a lug 42 to a toggle cylinder piston rod 50 operating in a toggle cylinder 52 pivotally anchored to the frame of the machine. When the toggle cylinder piston rod 50 is extended (FIG. 3) the movement of the toggle mechanism 36 urges the footform carriage 24 downwardly toward the mold assembly 16.

Figure 3:
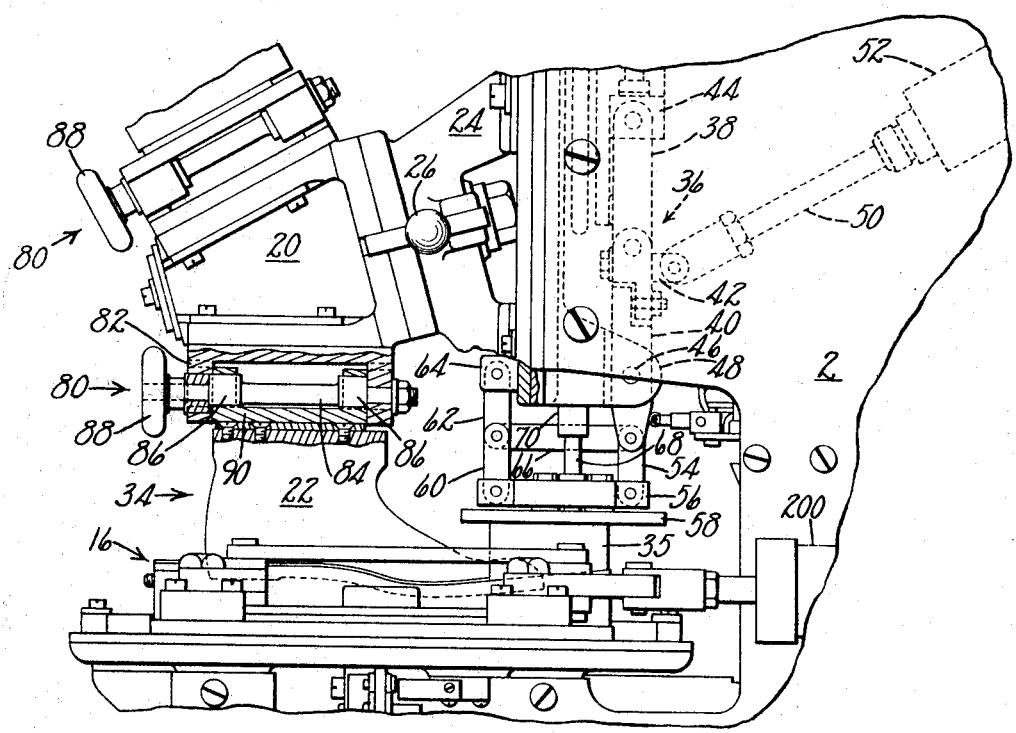
FIG. 3 is a side elevational view partly in section and similar to a portion of FIG. 2, but showing certain operating instrumentalities in different positions.

The opposite end of the link 40 is pivotally connected to one end of a toe cap link 54 (FIGS. 2 and 3). The other end of the link 54 is pivotally connected to a toe mold carrier 56 which has fixed thereto a toe mold mounting plate 58 on which is mounted the toe mold member 35. Also pivotally attached to the toe mold carrier 56 is one end of a link 60 which at its other end connects with a link 62. One end of the link 62 is pivotally attached to a lug 64 which is mounted on the carriage 24 (FIG. 3). The junctures of the links 60, 62 and the links 40, 54 are interconnected by a link 66. Thus, when the toggle mechanism 36 moves from the position shown in FIG. 2 to the position shown in FIG. 3, the link 40 pivots about the pin 46 causing the link 54 to move the toe mold carrier 56 downwardly a distance farther than that through which the carriage 24 moves. Movement of the links 40, 54 is transmitted by the link 66 to the links 60, 62 which contribute to the downward movement of the toe mold member 35. The toe mold member 35 is moved downwardly by the above described linkage means a distance sufficient to bring the toe mold member into contact with the side mold members 30, 32 and the top mold member 34. A pair of guide rods 68, each having one end fixed to the toe cap mold member 35, are slidably disposed in guide rod sleeves 70 (one shown in FIG. 3) secured to the carriage 32. The guide rods 68 insure that the toe cap mold member 35 moves in vertical direction only. The linkage means above described comprises a toe cap mold member moving means necessitating no changes to the pneumatic or electrical circuit of the machine. The toe cap mold linkage means operates responsive to the operation of the ordinary top mold carriage moving means. Thus, the toe cap mold member moving means of the present invention may be readily incorporated into existing machines with only minor modifications and alterations.

For the purpose of making minor adjustments in the position of the footform 22, there may be disposed between the footform housing 20 and each footform 22 a footform positioning means 80 comprising a bracket 82 retaining a rod 84 (FIG. 3) having cam portions 86 and a hand knob 88. A cam follower block 90 is movable by the cam 86 and is attached to the footform 22. Accordingly, rotation of the hand knob 88 causes movement of the cam 86 which in turn causes movement of the cam follower block 90 and therefore the footform 22. This feature is particularly useful where lasts are used as the top mold member rather than footforms. Because of the lack of uniformity in last dimensions it is helpful to be able to make minor vertical adjustments in the position of the footform.

Figure 5:
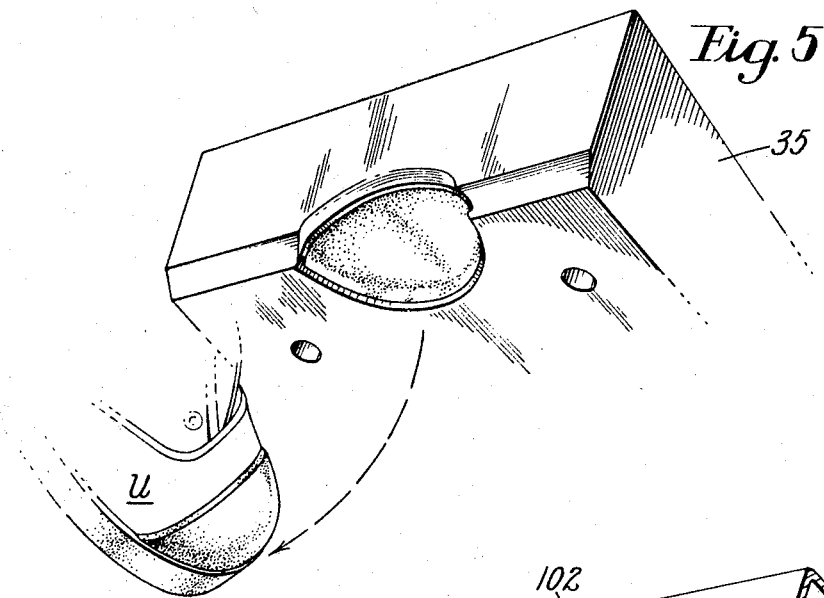
FIG. 5 is a perspective view of the toe cap mold member and the toe portion of the finished product.
Figure 6:
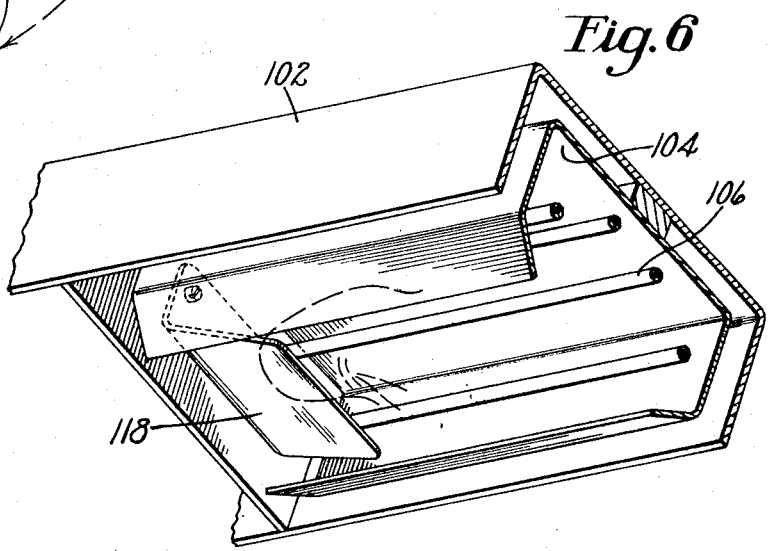
FIG. 6 is a perspective view of a portion of the external footform heating means, including the toe heating means.

Referring to FIGS. 2 and 6, there is provided on the machine means for heating not only the overlasted marginal portion but the toe portion of the lasted upper in the machine before subjecting the upper to the molding operation. A heat tray 100 is provided which may be pulled down over the footform and upper by the operator. The heat tray comprises a cover 102 (FIG. 5) with a reflector plate 104 and heating coil 106 mounted therein. The heat tray 100 is secured to a heat tray holder 108. Two lugs 110 extend from the sides of the heat tray holder 108. Arms 112, 114 pivotally interconnect the heat tray holder 108 and the frame 2 of the machine, so that the heat tray may rest in an out-of-the-way position, as indicated in phantom in FIG. 2, or may be pulled down over the footform as is illustrated in FIG. 2. To facilitate hand operation, the tray is equipped on its forward face with a handle 116.

As is fully shown and explained in the above cited patent application, the heat tray is rotatable automatically so that when the heat tray is moved from its footform heating position to its at rest position it undergoes a rotative movement which causes the open side of the tray, or heat radiating side, to rotate from a downward facing position to a generally upward facing position. In this manner the heat from the heat tray is directed upwardly and outwardly away from the machine when the tray is not in use. In addition to the reflector plate 104, as described in the above cited patent application, the heat tray of the present invention is provided with a toe reflector plate 118 which serves to direct heat onto the toe portion of the upper. Thus, not only the overlasted portion of the upper is heated, but also the toe portion of the upper, whereby to prepare the toe portion for receiving the injection molding material.

The operation of the machine is essentially the same as that described in U.S. patent application Ser. No. 452,213, filed Apr. 30, 1965, in the names of Charles J. Kitchener et al. However, briefly the operation is as follows: Assuming the electric motor E to have been started and the pneumatic circuit of the machine (similar to that shown in the above-mentioned patent application) to have been connected to a source of pressurized air, the operator places an upper onto one of the upright footforms 22. The operator then grasps the heat tray handle 116 and pulls the heat tray 100 toward the footform. As the heat tray moves toward the footform the heat radiating side, or open side, rotates from an upwardly facing position to a downwardly facing position as is fully described in the above-mentioned patent application. The heat tray comes to rest over the lasted upper $u$ on the footform 22. The operator then places an upper on the upwardly extending footform in the second station (only one station shown here) and pulls the heat tray down over the shoe. Having shoes on both upwardly extending footforms, the operator then returns to the first station and moves the heat tray back to its idle position.

By manipulation of the lever 26 the operator rotates the housing 20, causing the other footform of the first station to be brought into loading position and causing the footform having the lasted shoe thereon to move into position above the mold assembly 16. He then pushes a cycle start button (not shown) for that station. As is fully described in the above-mentioned patent application, side mold cylinders 200 cause the side mold members 30, 32 to close; the toggle cylinder 52 moves the lower footform into engagement with the mold assembly. The toe mold member then engages the side mold members and the toe portion of the upper $u$. If minor adjustment is required in the position of the footform, the operator manipulates the hand knob 88 until the footform is in firm engagement with the side mold members and toe mold member. By use of the footform positioning means 80, the operator can adjust the position of the footform either upwardly or downwardly. The injection of molten plastic or rubber is begun automatically as described in the above cited patent application. During the injection operation the operator places another upper on the upwardly extending footform of the first station and pulls the heat tray into position for heating the newly mounted upper.

Restricting the explanation to the first station only, for the sake of brevity, an electrical timer (not shown) causes the side mold members 30, 32 to open a certain time after injection of molding material into the mold cavity, and the carriage 24 to be elevated to its uppermost position. The operator then removes the heat tray and rotates the footform housing. He removes the upper with a sole unit and toe cap molded thereon from the upwardly extended footform. He may then place another upper on that footform, pull down the heat tray and start a new injection molding cycle.

Having thus described our invention what we claim as new and desire to secure by Letters Patent of the United States is:

1. A machine for molding soles and toe caps onto footwear, said machine comprising a frame, bottom and side mold means on the frame, at least one top mold member for supporting a lasted footwear upper, a toe cap mold member, carriage means supporting the top mold member and the toe cap mold member and mounted on the frame for movement toward and away from the bottom and side mold means, first toggle means on the frame for moving the carriage means to place the top mold member in cooperative relationship with the side mold means, second toggle means on the carriage means movable only in response to the operation of the first toggle means to place the toe cap mold member in cooperative relationship with the top mold member and the side mold means to enclose a mold cavity about the bottom and toe portions of the upper, and single power means for moving said first and said second toggle means.

2. The invention according to claim 1 including means for adjusting the position of said top mold member relative to said toe cap mold member and said side mold means.

3. The invention according to claim 2 in which said top mold member position adjusting means comprises cam operated means mounted on said carriage means.

4. The invention according to claim 1 including means mounted on said frame for movement into position adjacent said top mold member for heating a toe portion of said upper.

5. The invention according to claim 2 including means mounted on said frame for movement into position adjacent said top mold member for heating a toe portion of said upper.

6. An injection sole molding machine comprising a frame, a bottom mold member mounted on said frame, side mold members mounted on said frame and movable to engage the bottom mold member, a top mold member carriage mounted on said frame and having at least one top mold member mounted thereon for supporting a lasted footwear upper, said carriage being adapted to move said top mold member to a first position remote from said bottom and side mold members and to a second position proximate to said bottom and side mold members, means mounted on said frame and movable to engage said top mold member when the top mold member is in said first position for imparting heat to said top mold member, means mounted on said frame for moving said top mold member carriage whereby to move said top mold member from said second position into a third position in engagement with said side mold members, a toe cap mold member mounted on said carriage, means mounted on said carriage and responsive to said carriage moving means for moving said toe cap mold member into engagement with said top mold member in said third position and said side mold members, and means mounted on said carriage for selectively adjusting the third position of said top mold member relative to said toe cap mold member and said side mold members.

References Cited

UNITED STATES PATENTS

| 3,173,173 | 3/1965 | Lister | 18—175 |
| 3,343,223 | 9/1967 | Ludwig | 18—175 X |

FOREIGN PATENTS

| 1,193,007 | 4/1959 | France. |
| 1,303,615 | 8/1962 | France. |
| 1,371,131 | 7/1964 | France. |

J. HOWARD FLINT, JR., *Primary Examiner.*